United States Patent [19]
Yamaki

[11] Patent Number: 5,995,454
[45] Date of Patent: Nov. 30, 1999

[54] COMPUTER SYSTEM WITH ALARM POWER-ON FUNCTION AND AUTOMATIC STARTING METHOD THEREOF

[75] Inventor: Masayo Yamaki, Tokyo, Japan

[73] Assignee: Kabushiki Kaisha Toshiba, Kawasaki, Japan

[21] Appl. No.: 08/890,361

[22] Filed: Jul. 9, 1997

[30] Foreign Application Priority Data

Jul. 31, 1996 [JP] Japan ..................................... 8-201689

[51] Int. Cl.⁶ .......................... G04B 47/00; G04B 23/02; G06F 1/04; G06F 1/00
[52] U.S. Cl. .............................. 368/10; 368/73; 395/557; 395/559; 395/750.01; 395/750.05
[58] Field of Search .................................. 368/10, 28–29, 368/107–113; 364/569, 707; 395/550, 750, 551–560, 750.01–750.08

[56] References Cited

U.S. PATENT DOCUMENTS

| | | | |
|---|---|---|---|
| 5,218,704 | 6/1993 | Watts, Jr. et al. | 395/750 |
| 5,241,680 | 8/1993 | Cole et al. | 395/750 |
| 5,422,862 | 6/1995 | Wisor . | |
| 5,542,035 | 7/1996 | Kikinis et al. | 395/750 |

FOREIGN PATENT DOCUMENTS 7-225629  8/1995  Japan .

*Primary Examiner*—Vit Miska
*Attorney, Agent, or Firm*—Finnegan, Henderson, Farabow, Garrett & Dunner, L.L.P.

[57] ABSTRACT

When the user specifies the hours, minutes at which the system is to be started automatically, the year, month, day-of-month that the system is to be started automatically is determined by determining whether or not the specified hours, minutes has already passed the actual hours, minutes at the point in time at which the user specified the time. The determined year, month, day-of-month and the hours, minutes specified by the user are stored in a nonvolatile memory. In an RTC device, at least the hours, minutes of the year, month, day-of-month, hours, minutes stored in the memory can be set. When the actual hours, minutes has reached the set hours, minutes, the RTC device generates an alarm. When the RTC has generated an alarm, it is judged whether or not the actual year, month, day-of-month, hours, minutes at the point in time at which the alarm was generated coincides with the year, month, day-of-month, hours, minutes stored in the memory. If they coincide with each other, the automatic start-up of the system will be executed.

12 Claims, 7 Drawing Sheets

COMPUTER SYSTEM WITH ALARM POWER-ON FUNCTION AND AUTOMATIC STARTING METHOD THEREOF

BACKGROUND OF THE INVENTION

The present invention relates to a computer system and an automatic starting method thereof, and more particularly to a computer system with the alarm power-on function of an RTC (Teal Time Clock) device and an automatic starting method thereof.

In recent years, a personal computer with an alarm power-on function (an automatic starting function) has been developed. The alarm power-on function is the function of turning on the power supply of the system at a predetermined time without the user turning on the power switch.

Use of the alarm power-on function enables the system to be turned on at a given time without human intervention. For example, when a personal computer is used as a server for a LAN in an office, the server can be started up automatically at the starting time of office hours in the next morning and work can be started again from where the work was stopped the preceding day. Such a function is known as an alarm power-on function.

The alarm power-on function is usually realized by making use of an alarm (an alarm interrupt request) from the RTC device in the system. Specifically, in the RTC device, "hours, minutes" (alarm time) or "month, day-of-month, hours, minutes" (alarm time and alarm date) specified by the user are stored as alarm setting information. At the time determined by the alarm setting information, the RTC device gives an alarm. Then, on the basis of the alarm, the automatic starting process is started in the system.

With a conventional method, when the system is turned on after the alarm setting information has been set in the RTC device, the alarm setting information is invalidated, regardless of whether the turning on of the system was triggered by the user operating the power switch or by the alarm power-on function. This invalidates the alarm power-on function. The reason for this is as follows.

If the alarm power-on function is not invalidated when the system is turned on, but is allowed to remain valid, there is a probability that the computer will be automatically started unexpectedly contrary to the user's expectation.

Specifically, when the user has specified only "hours, minutes" (automatic starting time), because "year, month, day-of-month" have not been set, the system will be turned on at the set time on a holiday that the user does not expect, although the user wants to start the system automatically at the set time on weekdays, for example. When the user has specified "month, day-of-month, hours, minutes" (automatic starting date), because "year" has not been set, there is a possibility that the system will be turned on at the setting date in the next year that the user does not expect, although the user wants to turn on the system automatically at the setting date only this year.

For this reason, with the conventional method, the alarm setting information is invalidated each time the system is turned on.

With this method, however, when the user turns on the system before the set time for some reason, the system will not be turned on automatically at the time that the user has set, even when the system is turned off before the set time has been reached, because the alarm power-on function is invalidated. When the system needs to be turned on automatically at a specific time every day or on specific days of the week, for example, the user has to set the time for every day or for each of the specific days of the week, resulting in a lot of time and labor.

BRIEF SUMMARY OF THE INVENTION

Accordingly, it is an object of the present invention to provide a computer system capable of not only preventing the system from being turned on automatically at a time that the user has not expected, but also staring the system automatically at the set time reliably, even when the user has turned on and off the system before the set time has been reached, and also to provide an automatic starting method thereof.

It is another object of the present invention to provide a computer system capable of being started automatically the number of times (every day or for each of the specific days of the week) that the user desires, when the user has set a time for automatic start-up only once, and an automatic starting method thereof.

According to a first aspect of the present invention, there is provided a computer system comprising: means for accepting the user-specified hours, minutes at which the system is to be started automatically and determining whether or not the specified hours, minutes has already passed the actual hours, minutes at the point in time at which the user specified the time, thereby determining the year, month, day-of-month that the system is to be started automatically; a memory for storing the year, month, day-of-month determined by the determining means and the hours, minutes specified by the user; means in which at least the hours, minutes of the year, month, day-of-month, hours, minutes stored in the memory can be set and which generates an alarm when the actual hours, minutes has reached the set hours, minutes; and means, responsive to the alarm generated by the alarm generation means, for determining whether or not the actual year, month, day-of-month, hours, minutes at the point in time at which the alarm was generated coincides with the year, month, day-of-month, hours, minutes stored in the memory, and if they coincide with each other, executing the automatic start-up of the system.

According to a second aspect of the present invention, there is provided a computer system comprising: means for accepting the user-specified month, day-of-month, hours, minutes that the system is to be started automatically and determining whether or not the specified month, day-of-month has already passed the actual month, day-of-month at the point in time at which the user specified the date and time, thereby determining the year in which the system is to be started automatically; a memory for storing the year determined by the determining means and the month, day-of-month, hours, minutes specified by the user; means in which at least the hours, minutes of the year, month, day-of-month, hours, minutes stored in the memory can be set and which generates an alarm when the actual hours, minutes has reached the set hours, minutes; and means, responsive to the alarm generated by the alarm generation means, for determining whether or not the actual year, month, day-of-month, hours, minutes at the point in time at which the alarm was generated coincides with the year, month, day-of-month, hours, minutes stored in the memory, and if they coincide with each other, executing the automatic start-up of the system.

Each of the above systems may further comprise means for determining whether or not the year, month, day-of-month, hours, minutes stored in the memory has already passed the actual year, month, day-of-month, hours, minutes, when the system is turned off. If the year, month, day-of-month, hours, minutes stored in the memory has not passed the actual year, month, day-of-month, hours, minutes, at least the hours, minutes of the year, month, day-of-month, hours, minutes stored in the memory will be stored in the alarm generation means. In contrast, if the year, month, day-of-month, hours, minutes stored in the memory has already passed the actual year, month, day-of-month, hours, minutes, the automatic start-up of the system will be invalidated.

Furthermore, the alarm generation means may be composed of an RTC (Real Time Clock) device. In this case, the RTC device may have a clock module for counting the actual year, month, day-of-month, hours, minutes.

Still furthermore, each of the above systems may further comprise a display for displaying a setting screen that enables the user to specify the hours, minutes. In this case, the setting screen on the display may enable the user to specify the validation/invalidation of the function of the system.

Moreover, the setting screen on the display may enable the user to further specify more than one day of the week on which automatic start-up is to be effected. In this case, the system of the first aspect may further comprise means for, when the user has specified a day of the week on which automatic start-up is to be effected, determining whether or not the specified day of the week has already passed the actual day of the week at the point in time at which the user specified the day of the week, thereby determining the year, month, day-of-month corresponding to the day of the week on which the system is to be started automatically next time.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 6 shows a second example of the alarm power-on setting screen used in the system of the embodiment;

DETAILED DESCRIPTION OF THE INVENTION

A preferred embodiment of the present invention will now be described with reference to the accompanying drawings.

Figure 1:
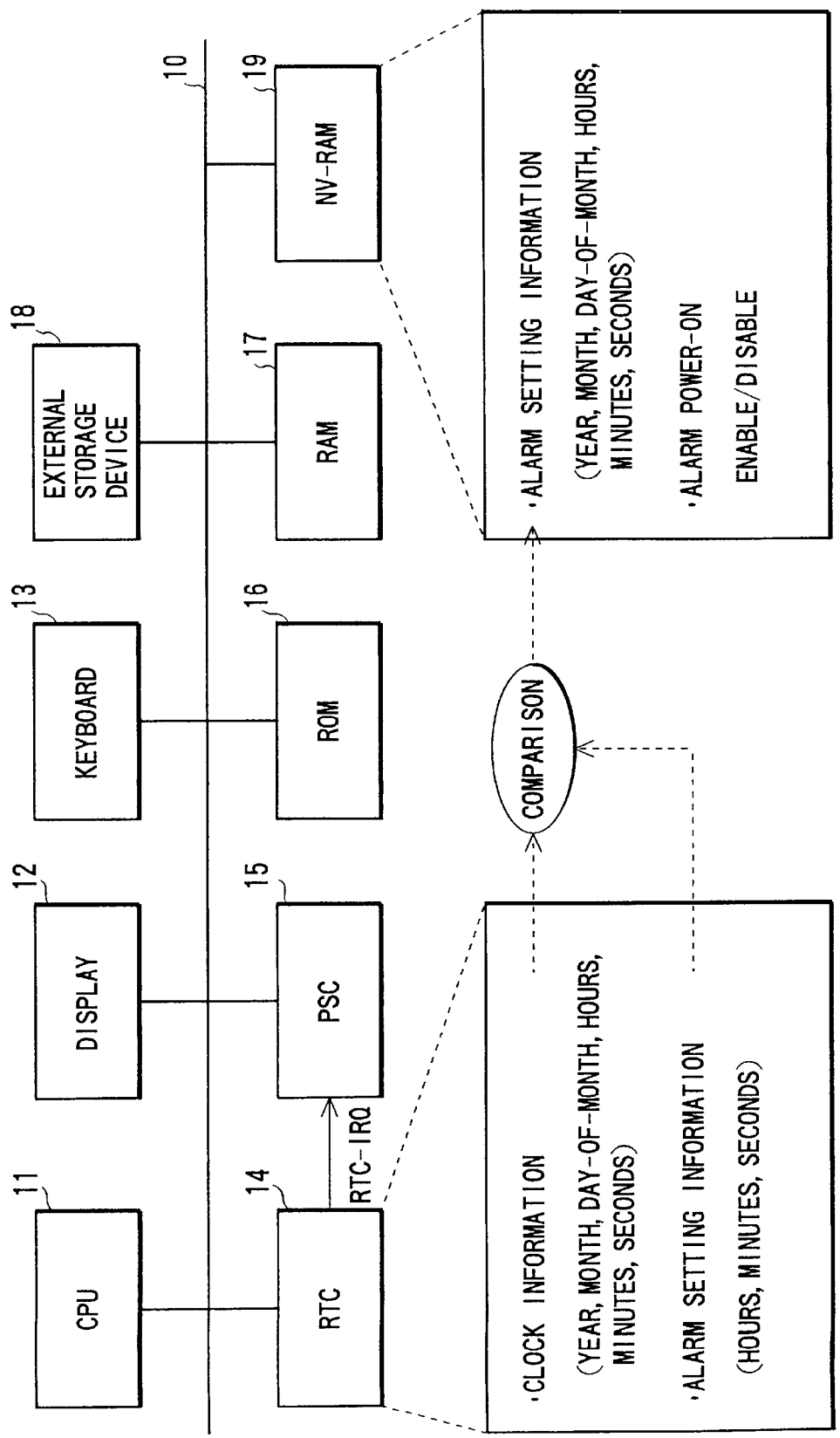
FIG. 1 is a block diagram of a computer system according to a first embodiment of the present invention.

FIG. 1 shows the configuration of a computer system according to an embodiment of the present invention. The computer system is a personal computer of the notebook type or the like. As shown in the figure, the computer system comprises a CPU 11, a display unit 12, a keyboard 13, an RTC device 14, a power supply controller (PSC) 15, a BIOS-ROM 16, a RAM 17, an external storage device 18, such as a magnetic disk device, and a nonvolatile memory 19. All these are connected to a bus 10.

The CPU 11 controls the entire system and executes the operating system in the RAM 17, the alarm power-on setting program that prompts the user to set the date and time that the system is to be started automatically, and the system BIOS in the BIOS-ROM 16.

On the display unit 12, screens, including a program screen that enables the user to set the date and time that the system is to be started automatically, are displayed.

The keyboard 13 is used as an input unit for the user to enter the setting data using a program.

The RTC device 14 is a clock module for counting the present date "year, month, day-of-month" and time "hours, minutes, seconds," and is backed up by a special battery. The clock module also provides "the day of the week" corresponding to the present date.

The RTC device 14 is also provided with an alarm function and generates an alarm (alarm interrupt request RTC-IRQ) when the time specified by the alarm setting information stored in the device has been reached. According to the type of the RTC device 14, it is possible to set "hours, minutes" (alarm time) only, or "month, day-of-month, hours, minutes" or "year, month, day-of-month, hours, minutes" (alarm time and alarm date) as alarm setting information. The alarm setting information set in the RTC device 14 includes the "hours, minutes" (alarm time) or "month, day-of-month, hours, minutes" (alarm time and alarm date) specified by the user.

The PSC 15 is kept in the operating state by the battery even when the power supply of the system is off. When receiving an alarm from the RTC device 14 with the system in the power-off state, the PSC 15 turns on the system power supply (not shown) provided in the computer system.

The BIOS-ROM 16 is a ROM that stores the BIOS for executing various processes, including the system power-on process and power-off process.

The RAM 17 is used as the main memory of the system. Various programs to be executed, including the alarm power-on setting program the user uses to set the alarm setting information, are loaded from the non-volatile memory 19 into the RAM 17.

The nonvolatile memory 19 is made up of, for example, an NV-RAM (nonvolatile RAM) and holds information indicating whether the setting of the alarm power-on function is enabled or disabled and alarm setting information indicating "year, month, day-of-month, hours, minutes" that the system is to be started automatically by the alarm power-on function. The alarm setting information stored in the nonvolatile memory 19 includes at least the alarm time "hours, minutes" specified by the user.

The alarm setting information indicating "year, month, day-of-month, hours, minutes" is what is obtained by adding the "year, month, day-of-month" determined by a specific process to the "hours, minutes" (alarm time) specified by the user, or by adding the "year" determined by a specific process to the "month, day-of-month, hours, minutes" (alarm date and alarm time) specified by the user.

Figure 2:
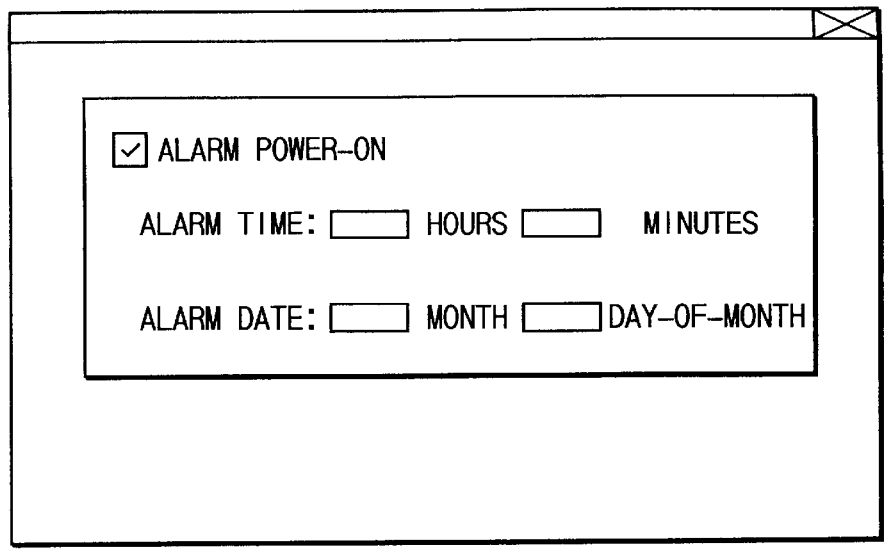
FIG. 2 shows a first example of the alarm power-on setting screen used in the system of the embodiment.

FIG. 2 shows an example of the setting screen produced by the alarm power-on setting program.

On the setting screen, a check box for setting the enabling/disabling of the alarm power-on function appears on the top left of the screen, and also an input box for alarm time "hours, minutes" and alarm date "month, day-of-month" appears. When the user checks the check box, the alarm power-on function is enabled, allowing the user to specify the alarm time and alarm date. When the alarm power-on function has been set to the enable state, the alarm time must be specified without fail. The alarm date has to be specified only when the user wants to set the alarm date to a later date than the date (e.g., when the user wants to set the alarm date to the day after tomorrow or later) on which the next alarm time will be reached. With no alarm date specified, when the next alarm time has been reached, the computer system is started automatically by the alarm power-on function.

In the embodiment, the alarm time specified by the user automatically takes the form of "year, month, day-of-month, hours, minutes" as described in detail later, and is stored in the nonvolatile memory 19. In this case, the user has only to specify the alarm time or the alarm time and alarm date, and need not specify "year." The reason is to simplify the user's specifying operation. As explained in detail, when the user turns off the system after the specifying operation, at least "hours, minutes" of the "year, month, day-of-month, hours, minutes" stored in the nonvolatile memory 19 are stored in the RTC device 14.

Figure 3:
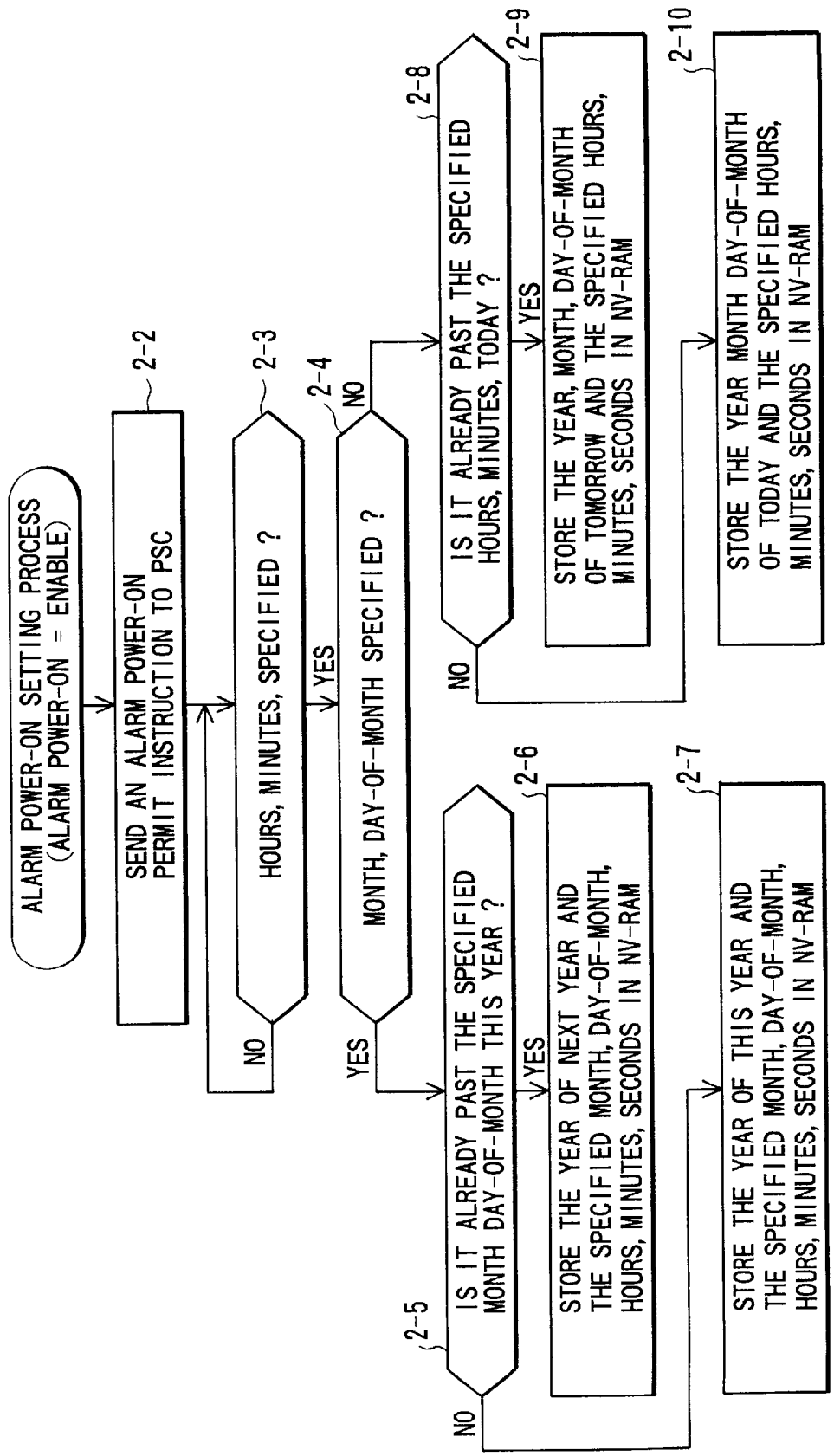
FIG. 3 is a flowchart of the processing procedure for setting the alarm power-on function using the alarm power-on setting screen of FIG. 2.

Next, the process of setting the alarm power-on function using the setting screen of FIG. 2 will be explained. FIG. 3 shows the processing procedure for the alarm power-on setting program in a case where the check box at the top left of the setting screen of FIG. 2 has been checked.

When the check box at the top left of the setting screen is checked, the alarm power-on setting program gives the PSC 15 an alarm power-on permit instruction (step 2—2).

Receiving the instruction, the PSC 15 goes into the power-on sequence enable state in response to the alarm (alarm interrupt requlest RTC-IRQ) from the RTC device 14. At step 2—2, the data indicating that then alarm power-on function is valid is also stored in the nonvolatile memory 19.

Thereafter, the alarm power-on setting program checks to see if the alarm time and alarm date have been specified (recorded in the RTC device 14) (steps 2-3, 2-4). If both of the alarm time and alarm date have been specified, the processes at steps 2-5 to 2-7 will be carried out. If only the alarm time has been specified and the alarm date has not been specified, the steps 2-8 to 2-10 will be executed.

Specifically, if both of the alarm time and alarm date have been specified, the alarm power-on setting program will compare the "month, day-of-month" specified by the user with the present "month, day-of-month" read from the RTC device 14 and check to see if the "month, day-of-month" specified by the user has already been passed this year (step 2-5).

If the "month, day-of-month" specified by the user has already passed the present "month, day-of-month," the alarm power-on setting program will determine the coming year obtained by adding one to the present year read from the RTC device 14 to be the "year" for automatic start-up and store the "year" of the coming year, the "month, day-of-month" and "hours, minutes" specified by the user in the nonvolatile memory 19 as alarm setting information (step 2-6). In the present embodiment, it is assumed that "seconds" need not be set. For this reason, "seconds" are assumed to be treated as zero and information on "seconds" not to be included in the alarm setting information.

If the "month, day-of-month" specified by the user has not passed the present "month, day-of-month," the alarm power-on setting program will store the present "year" read from the RTC device 14 and the "month, day-of-month" and "hours, minutes" specified by the user in the nonvolatile memory 19 as alarm setting information (step 2-7).

If at step 2-4, "month, day-of-month" have not been specified (only the alarm time has been specified), the alarm power-on setting program will compare the "hours, minutes" specified by the user with the present "hours, minutes" read from the RTC device 14 and check to see if the "hours, minutes" has already been passed today (step 2-8).

If the "hours, minutes" specified by the user has already passed the present "hours, minutes," the alarm power-on setting program will determine the date of tomorrow obtained by adding one to the present date read from the RTC device 14 to be the "year, month, day-of-month" for automatic start-up and store tomorrow's "year, month, day-of-month" and the "hours, minutes" specified by the user in the nonvolatile memory 19 as alarm setting information (step 2-9).

If the "hours, minutes" specified by the user has not passed the present "hours, minutes," the alarm power-on setting program will store the present "year, month, day-of-month" read from the RTC device 14 and the "hours, minutes" specified by the user in the nonvolatile memory 19 as alarm setting information (step 2-10).

As described above, when the user has specified "hours, minutes," the "hours, minutes" is compared with the "hours, minutes" at the point in time that the user specified the time, to determine the "year, month, day-of-month" for automatic start-up, and the resulting "year, month, day-of-month, hours, minutes" are stored in the nonvolatile memory 19. When the user has specified "month, day-of-month, hours, minutes," the "month, day-of-month" is compared with the "month, day-of-month" at the point in time that the user specified the time, to determine the "year" for automatic start-up, and the resulting "year, month, day-of-month, hours, minutes" are stored in the nonvolatile memory 19.

When the user operates the power switch to turn off the system power supply, at least the "hours, minutes" of the "year, month, day-of-month, hours, minutes" stored in the nonvolatile memory 19 are set in the RTC device 14 as alarm setting information. The alarm setting information stored in the nonvolatile memory 19 is referred to in order to judge whether or not the present system should be turned on when the alarm has caused the system power supply to be turned on.

Next, the process of the system BIOS executed when the system power supply is turned on will be described by reference to the flowchart of FIG. 4.

Here, consider a case where the RTC device 14 is of such a type as cannot store "year, month, day-of-month" as alarm setting information, but can store only "hours, minutes" and only "hours, minutes" have been set in the RTC device 14 as alarm setting information on the present RTC device 14.

In this case, the RTC device 14 functions as a 24-hour timer that generates an alarm once in 24 hours.

When the system power supply is turned on by the power switch operation or by the alarm, the CPU 11 first executes the system BIOS. At this time, the PSC 15 supplies electric power only to the fewest devices that the CPU 11 can execute programs for. The PSC does not supply electric power to the other devices, including the display unit 12 and external storage device 18.

Referring to the internal status of the PSC 15, for example, the system BIOS checks to see if the turning on of the system power supply has been done by the alarm from the RTC device 14 (step 4-1).

If the power supply has not been turned on by the alarm (if the power supply has been turned on by the power switch operation), a usual power-on process will be carried out and the automatic starting process for starting the system operation will be started (step 4-3). The system operation includes supplying electric power to all of the devices and booting up the operating system (or the resume process of restoring the information saved immediately before the power supply was turned off).

If the power supply has been turned on by the alarm, the system BIOS will compare the "year, month, day-of-month" for automatic start-up read from the nonvolatile memory 19 with the present "year, month, day-of-month" read from the RTC device 14 to see if they coincide with each other (step 4-2).

If the "year, month, day-of-month" for automatic start-up coincides with the present "year, month, dayof-month," the usual power-on process will be carried out as when the power supply has been turned on by the power switch operation. That is, the automatic starting process to start the system operation will be started (step 4-3). The system operation includes supplying electric power to all of the devices and booting up the operating system (or the resume process of restoring the information saved immediately before the power supply was turned off).

If the "year, month, day-of-month" for automatic start-up does not coincide with the present "year, month, day-of-month," the system BIOS will give the PSC 15 a system power-off instruction and the system will be turned off immediately (step 4—4).

For the aforementioned series of processes, explanation has been given about the case where the RTC device 14 is of the type that can hold only "hours, minutes" as alarm setting information. Where the RTC device 14 is of the type that can hold "month, day-of-month, hours, minutes" excluding "year" as alarm setting information, the "year" for automatic start-up read from the nonvolatile memory 19 is compared with the present "year" read from the RTC device 14 at step 4-2. At steps 4-3, 4—4, the power-on process or power-off process is carried, depending on whether they coincide with each other or not.

If the RTC device 14 is of the type that can hold "year, month, day-of-month, hours, minutes" as alarm setting information, steps 4-1, 4-2, and 4—4 will be unnecessary and only the usual power-on process at step 4-3 will be executed.

Next, the process of the system BIOS executed when the system power supply is turned off by the power switch operation will be described by reference to the flowchart of FIG. 5.

When the system power supply is turned off by the user operating the power switch, the system BIOS determines from the information stored in the nonvolatile memory 19 whether or not the alarm power-on function has been set to the enable state (step 4-5).

If the alarm power-on function has not been set to the enable state, the usual power-on process will be carried out (step 4-9).

If the alarm power-on function has been set to the enable state, the system BIOS will compare the "year, month, day-of-month, hours, minutes" for automatic start-up stored in the nonvolatile memory 19 with the present "year, month, day-of-month, hours, minutes" obtained from the RTC device 14 to see if the "year, month, day-of-month, hours, minutes" for automatic start-up has already passed the present "year, month, day-of-month, hours, minutes" (step 4-6).

If the "year, month, day-of-month, hours, minutes" for automatic start-up has already passed the present "year, month, day-of-month, hours, minutes" (that is, when the user has set the alarm power-on function using the alarm power-on setting program and thereafter turned on the system, it is already past the set alarm date), the alarm power-on function should be disabled and the system BIOS will disable the alarm power-on function by rewriting the contents of the nonvolatile memory 19 (invalidate the "year, month, day-of-month, hours, minutes" for automatic start-up) and give the PSC 15 an alarm power-on inhibit instruction (step 4-8). After receiving the instruction, the PSC 15, from this time on, does not execute the power-on sequence even if it receives the RTC-IRQ signal. Thereafter, the usual power-off process is carried out (step 4-9).

If at step 4-6, the "year, month, day-of-month, hours, minutes" for automatic start-up has not passed the present "year, month, day-of-month, hours, minutes" yet, the alarm power-on function should be kept valid and the "hours, minutes" of the "year, month, day-of-month, hours, minutes" for automatic start-up stored in the nonvolatile memory 19 will be set in the RTC device 14 as alarm setting information (step 4-7). When the RTC device 14 is of the type that can hold "month, day-of-month, hours, minutes," "month, day-of-month, hours, minutes" will be set as alarm setting information. When the RTC device 14 is of the type that can hold "year, month, day-of-month, hours, minutes," "year, month, day-of-month, hours, minutes" will be set in the RTC device 14 as alarm setting information. Thereafter, the usual power-off process is carried out (step 4-9).

After the power supply has been turned off this way, the RTC device 14 generates an alarm in accordance with the "hours, minutes" or "month, day-of-month, hours, minutes" or "year, month, day-of-month, hours, minutes" set in the RTC device 14.

As described above, according to the aforementioned processing procedure, when the "hours, minutes" or "year, month, day-of-month, hours, minutes" that the computer system is to be started automatically have been specified, the "year, month, day-of-month" or "year" for automatic start-up is determined and these are set in the RTC device 14 as alarm setting information. When the RTC device 14 has generated an alarm, it is judged whether or not the actual "year, month, day-of-month, hours, minutes" at the time that the alarm was given coincides with the "year, month, day-of-month, hours, minutes" stored in the nonvolatile memory 19. If they coincide with each other, the system will be started automatically. When the system is turned off, it is judged whether or not the "year, month, day-of-month, hours, minutes" stored in the nonvolatile memory 19 has already passed the actual "year, month, day-of-month, hours, minutes." If the former has not passed the latter, at least the "hours, minutes" of the "year, month, day-of-month, hours, minutes" stored in the nonvolatile memory 19 will be stored in the RTC device 14. If the former has passed the latter, the alarm power-on function of the system will be invalidated.

Figure 6:
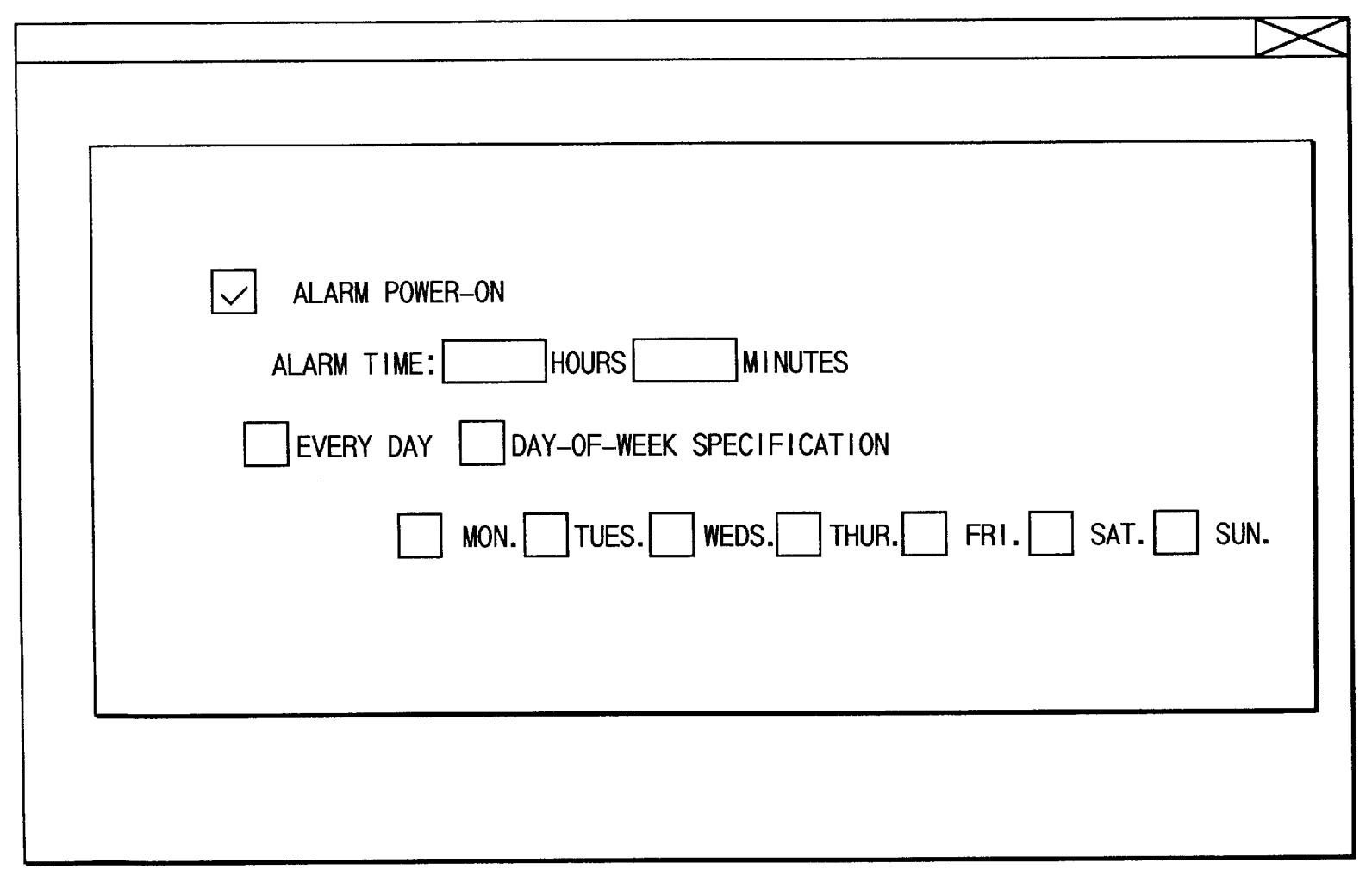

FIG. 6 shows a second example of the setting screen produced by the alarm power-on setting program.

On the setting screen, a check box for specifying the enabling/disabling of the alarm power-on function appears at the top left of the screen. Additionally, an input check box for "alarm time (hours, minutes)" and a check box for specifying "days of the week (one or more days in the range from Monday to Sunday)" that automatic start-up is to be executed at the alarm time or "every day" appears on the setting screen.

When the check box to the left of "alarm power-on" is checked, the alarm power-on function is enabled, making it possible to specify "alarm time" and "day of the week." When the alarm power-on function has been set to the enable state, "alarm time" and "every day" or "day of the week" must be specified.

Next, the alarm power-on setting process executed using the setting screen of FIG. 6 will be explained. FIG. 6 shows the processing procedure for the alarm power-on setting program in a case where the check box at the top left of the setting screen of FIG. 6 has been checked.

When the check box at the top left of the setting screen is checked, the alarm power-on setting program gives the PSC 15 an alarm power-on permit instruction (step 3-2). Receiving the instruction, the PSC 15 goes into the power-on sequence enable state in response to the alarm (RTC-IRQ) from the RTC device 14. Additionally, at step 3-2, the data indicating that the alarm power-on function is valid is stored in the nonvolatile memory 19. Thereafter, the alarm power-on setting program waits for "alarm time" and "every day" or "day of the week" to be specified (steps 3-3, 3-4) and stores the "hours, minutes" specified as the alarm time and the specified "day of the week" in the nonvolatile memory 19 as user setting information (step 3-5). When "every day" has been specified, it is considered that all of the days of the week have been specified.

Thereafter, the "year, month, day-of-month, hours, minutes" for automatic start-up have to be determined on the basis of the user setting information of the "alarm time" and "day of the week" stored in the nonvolatile memory 19. The determining process is carried out by the system BIOS in the power-off process in order to enable automatic start-up to be carried out two or more times (at the same time every day or on a specific day of the week) after the user has set the necessary data items once. The flow of the processing of the system BIOS at that time is shown in FIG. 8.

Figure 5:
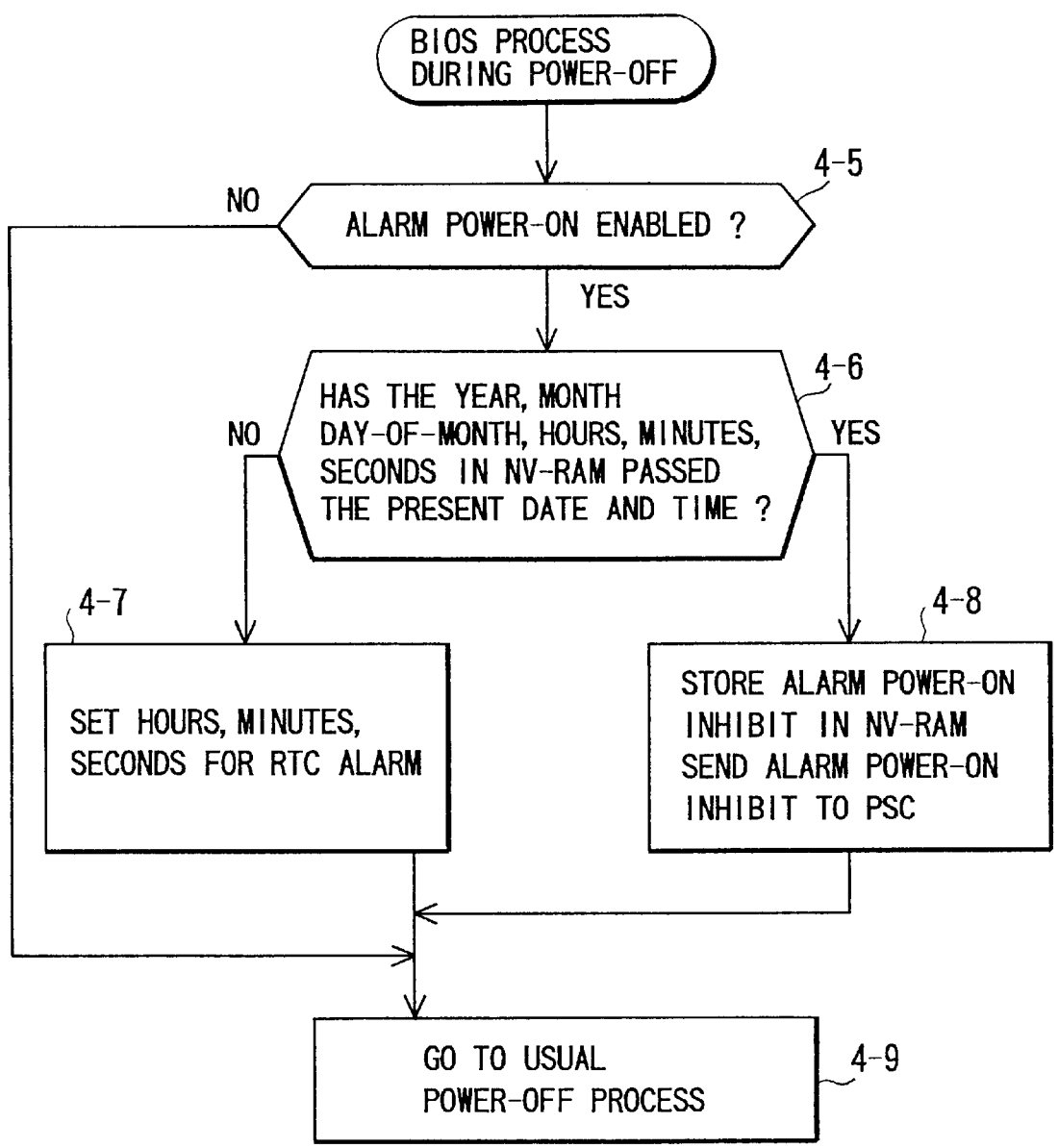
FIG. 5 is a flowchart of the BIOS processing procedure executed in the power-off process of the system of the embodiment.
Figure 7:
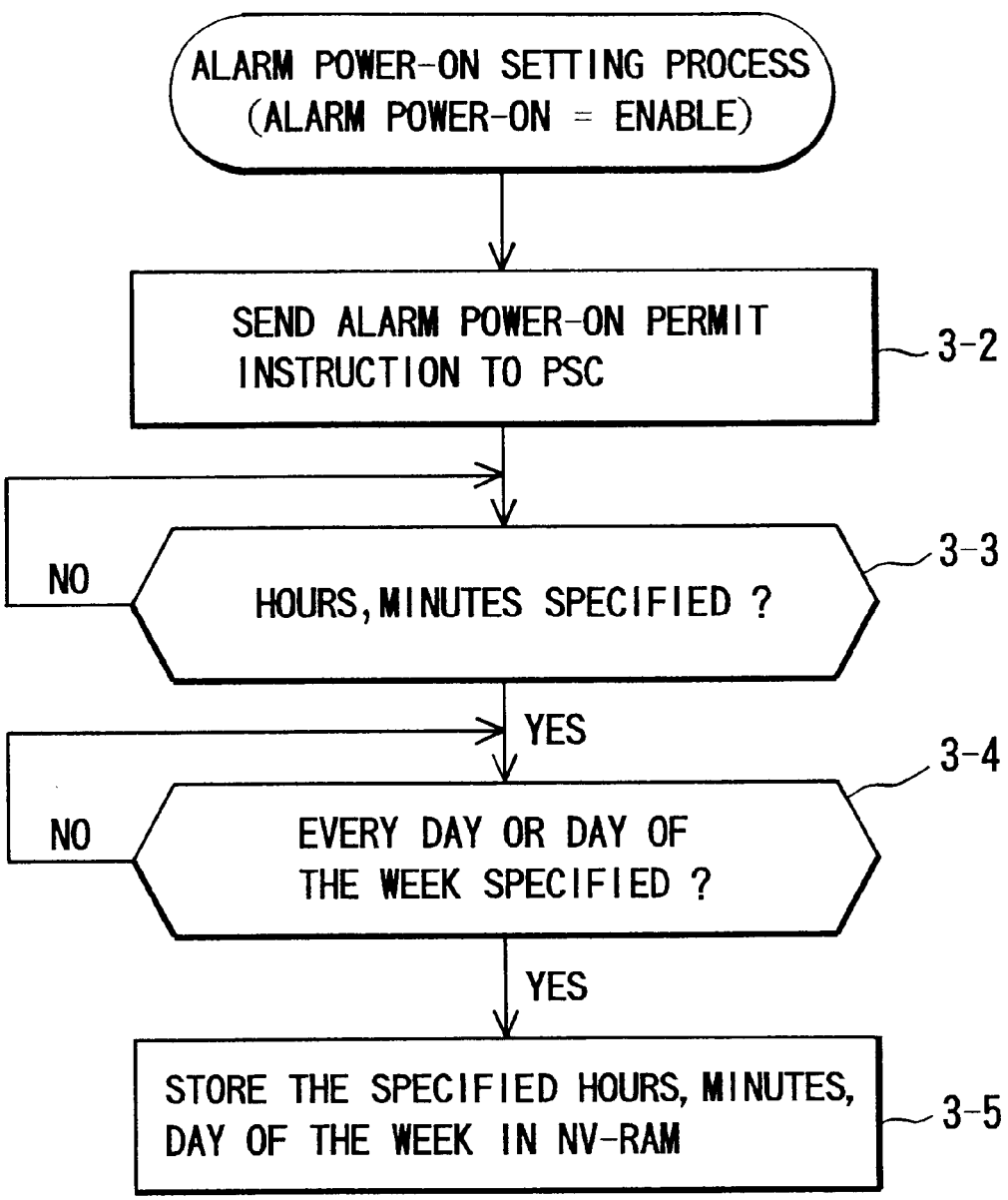
FIG. 7 is a flowchart of the processing procedure for setting the alarm power-on function using the alarm power-on setting screen of FIG. 6.
Figure 8:
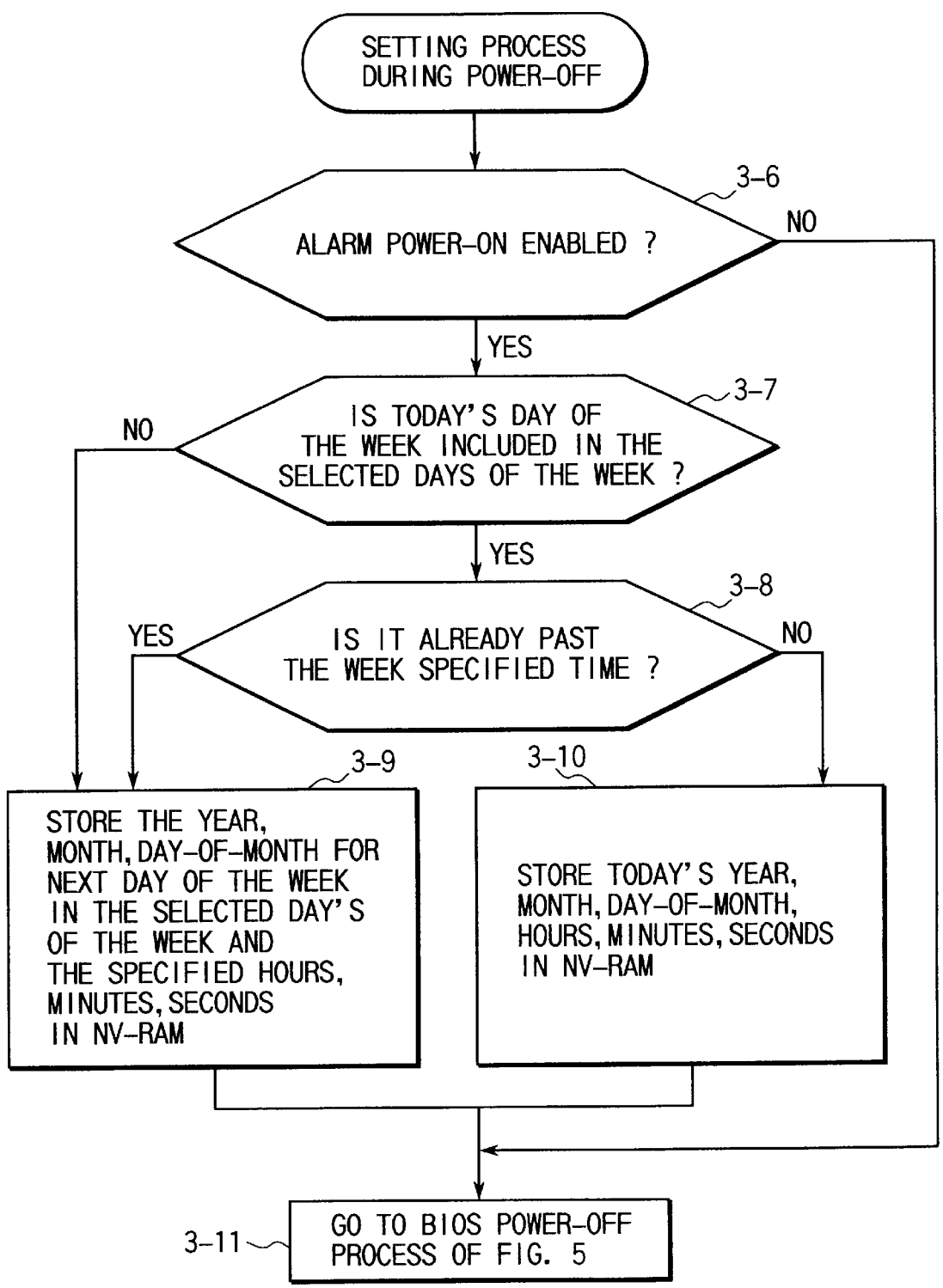
FIG. 8 is a flowchart of the BIOS processing procedure executed in the system power-off process in the case where the alarm power-on function has been set using the alarm power-on setting screen of FIG. 6.

The process of FIG. 8 is executed before the process of FIG. 5 (the BIOS process at the time of power off). In a case where the system BIOS is compatible with APM, when the BIOS gives notice that the system power supply will be turned off via the OS, the main routine is started. When the main program is not compatible with APM, the main routine is included in the BIOS power-off routine.

First, the system BIOS determines from the information stored in the nonvolatile memory 19 whether the alarm power-on function has been set to the enable state (step 3-6).

If the alarm power-on function has not been set to the enable state, the power-off process of FIG. 5 will be carried out (step 3-11).

If the alarm power-on function has been set to the enable state, the system BIOS will compare each of the user-specified days of the week stored in the nonvolatile memory 19 with the present day of the week obtained from the RTC device 14 to see if the present day of the week has been specified by the user (step 3-7).

If the present day of the week has been specified by the user, the system BIOS will compare the alarm time stored in the nonvolatile memory 19 with the present time obtained from the RTC device 14 to see if it is already past the user-specified alarm time today (step 3-8).

If it is already past the user-specified alarm time today, or if the present day of the week has not been specified at step 3-7, the "year, month, day-of-month, hours, minutes" on a subsequent day of the week immediately after the present day of the week of the days of the week specific by the user will be determined on the basis of the alarm time and day of the week specified by the user and the present "year, month, day-of-month" read from the RTC device 14. The determined "year, month, day-of-month, hours, minutes" are stored in the nonvolatile memory 19 as the "year, month, day-of-month, hours, minutes" that the system is to be started automatically next time (step 3-9).

When the present day of the week has been specified and it is not past the alarm time specified by the user, the "year, month, day-of-month, hours, minutes" for the present day read from the RTC device 14 and the alarm time specified by the user will be stored in the nonvolatile memory 19 as the "year, month, day-of-month, hours, minutes" that the system is to be started automatically next time (step 3-10).

After the "year, month, day-of-month, hours, minutes" for the next automatic start-up have been stored in the nonvolatile memory 19, the power-off process of FIG. 5 is carried out (step 3-11), where the alarm setting information is set in the RTC device 14.

Figure 4:
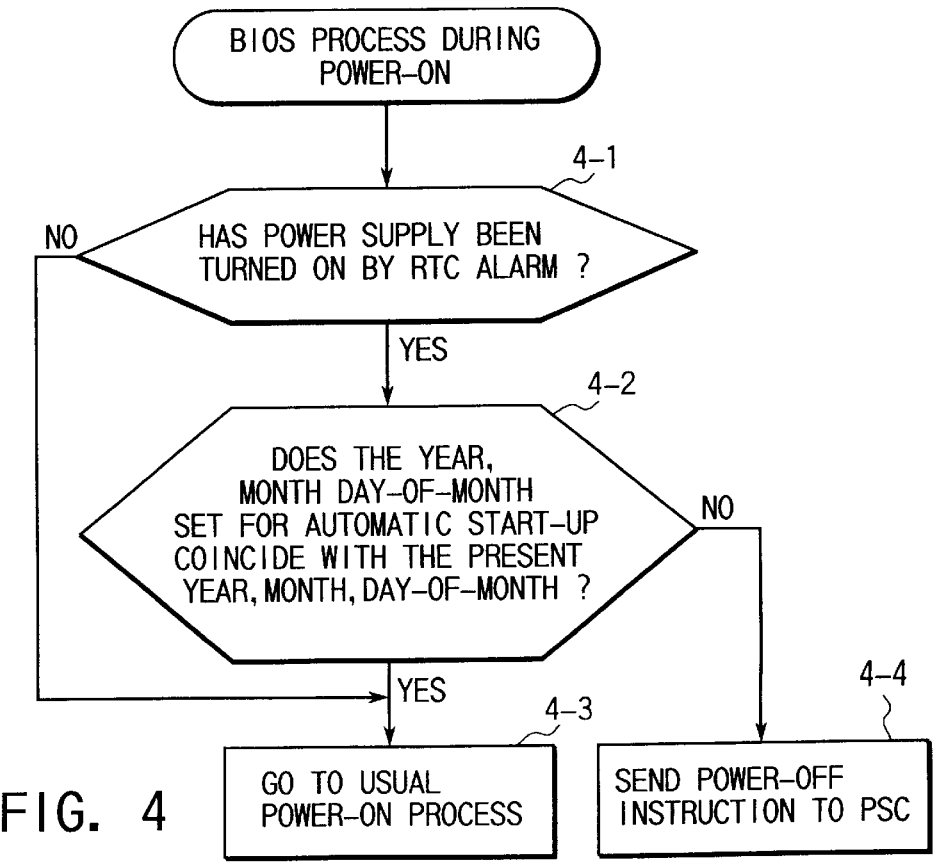
FIG. 4 is a flowchart of the BIOS processing procedure executed in the power-on process of the system of the embodiment.

The system BIOS process in the power-on process is carried out according to the same procedure as in FIG. 4.

According to the above-described procedure, each time the computer system is turned off, the day of the week ("year, month, day-of-month") that the system is to be started automatically is determined from the specified day of the week. Because these determined days of the week are set again in the RTC device 14 in the form of "year, month, day-of-month, hours, minutes" as alarm setting information, only one setting operation by the user enables automatic start-up to be effected two or more times (the same time every day or on a specified day of the week).

As described in detail, with the present invention, when the user has specified the time "hours, minutes," a check is made to see if the specified "hours, minutes" has passed the present "hours, minutes," which determines the "year, month, day-of-month" for automatic start-up, making it possible to store the point in time for automatic start-up in the form of "year, month, day-of-month, hours, minutes." When the user has specified the date "month, day-of-month" and the time "hours, minutes," a check is made to see if the specified "month, day-of-month" has passed the present "month, day-of-month," which determines the "year" for automatic start-up, making it possible to store the point in time for automatic start-up in the form of "year, month, day-of-month, hours, minutes." Moreover, when the user has specified "every day" or "specific day of the week," the "year, month, day-of-month" for the next automatic start-up is determined, making it possible to store the point in time for automatic start-up in the form of "year, month, day-of-month, hours, minutes."

As described above, because the point in time for automatic start-up can be stored in form of "year, month, day-of-month, hours, minutes", even when the user has turned on and off the system by operating the power switch before automatic start-up, it is possible to judge correctly whether or not the alarm power-on function should be kept valid at that time, which makes it possible to keep the alarm power-on function valid until the point in time for automatic start-up has been reached.

With the present invention, the alarm power-on function is not always kept valid differently from a conventional equivalent. This eliminates the possibility that the system will be started automatically with the timing the user has not expected. Furthermore, with the present invention, the alarm power-on function is not invalidated each time the system is turned on, differently from a conventional equivalent. This eliminates the disadvantage that the user has to set the automatic start-up time each time turning on the system.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

I claim:

1. A computer system comprising:

a nonvolatile memory;

means for designating time information at which the system is to be started automatically;

means for determining whether or not the designated time information has already passed current time information at the point in time at which a user designated the time information; and means for obtaining time information that the system is to be started automatically if the determining means determines that the designated time information has already passed the current time information.

2. The system according to claim 1, wherein the designating means designates at least hours, minutes at which the system is to be started automatically;

the determining means determines whether or not the designated hours, minutes has already passed current hours, minutes at the point in time at which the user designated the time; and the obtaining means obtains month, day-of-month that the system is to be started automatically if the designating means determines that the designated hours, minutes has already passed the actual hours, minutes.

3. The system according to claim 1, further comprising means for storing the obtained month and day-of-month in a nonvolatile memory.

4. The system according to claim 1, wherein the obtaining means obtains the day and the day-of-month from a real time clock circuit for counting at least month, day-of-month, hours, and minutes.

5. The system according to claim 1, further comprising:

means for determining whether or not the designated hours, minutes has already passed today; and means for storing month, day-of-month of tomorrow and the designated hours, minutes, seconds in a nonvolatile memory if the determining means determines that the designated hours, minutes has already passed today.

6. The system according to claim 1, further comprising:

means for determining whether or not the designated hours, minutes has already passed today; and means for storing month, day-of-month of today and the designated hours, minutes, seconds in a nonvolatile memory if the determining means determines that the designated hours, minutes has not already passed today.

7. The system according to claim 1, further comprising:

means for determining whether or not the designated month, day-of-month has already passed this year; and means for storing year of next year and the designated month, day-of-month, hours, minutes, seconds in a nonvolatile memory if the determining means determines that the designated month, day-of-month has already passed this year.

8. The system according to claim 1, further comprising:

means for determining whether or not the designated month, day-of-month has already passed this year; and means for storing year of this year and the designated month, day-of-month, hours, minutes, seconds in a nonvolatile memory if the determining means determines that the designated month, day-of-month has not already passed this year.

9. A computer system comprising:

means for determining whether or not time information stored in a nonvolatile memory has passed a present date and time; and means for setting the time information in a real time clock circuit as alarm information if the determining means determines that the time information stored in the nonvolatile memory has not passed the present date and time.

10. The system according to claim 9, wherein the determining means determines whether or not at least hours, minutes stored in a nonvolatile memory has passed the present date and time; and the setting means sets at least hours, minutes in a real time clock circuit as alarm information if the determining means determines that the at least hours, minutes stored in the nonvolatile memory has not passed the present date and time.

11. A computer system comprising:

means for determining whether time information stored in a nonvolatile memory has passed a present date and time; and means for disabling an alarm power-on inhibit data in the nonvolatile memory and for sending an alarm power-on inhibit data to a power supply controller if the determining means determines that the time information stored in the nonvolatile memory has passed the present date and time.

12. The system according to claim 11, further comprising additional means for determining whether or not the alarm power-on is enabled; and wherein the determining means determines whether the time information stored in the nonvolatile memory has passed the present date and time if the additional means determines that the alarm power-on is enabled.

* * * * *